United States Patent [19]

Göedderz

[11] Patent Number: 5,169,081
[45] Date of Patent: Dec. 8, 1992

[54] STRIP HANDLING APPARATUS AND METHOD

[75] Inventor: Dieter Göedderz, Erkelenz, Fed. Rep. of Germany

[73] Assignee: Draftex Industries Limited, Edinburgh, Scotland

[21] Appl. No.: 817,141

[22] Filed: Jan. 6, 1992

Related U.S. Application Data

[62] Division of Ser. No. 472,356, Jan. 30, 1990, abandoned.

[30] Foreign Application Priority Data

Feb. 4, 1989 [GB] United Kingdom ............... 8902505
Jun. 22, 1989 [GB] United Kingdom ............... 8914299

[51] Int. Cl.$^5$ .................. B65H 16/00; B65H 75/00
[52] U.S. Cl. .................. 242/54 R; 242/58.6; 242/55; 29/235
[58] Field of Search ........... 242/55, 58.6, 79, 54 R; 29/235, 450

[56] References Cited

U.S. PATENT DOCUMENTS

| 4,392,912 | 7/1983 | Horsley | 242/58.6 X |
|---|---|---|---|
| 4,520,966 | 6/1985 | Bloch et al. | 242/54 R |
| 4,620,354 | 11/1986 | Hess et al. | 29/235 X |
| 4,715,110 | 12/1987 | St. Angelo et al. | 29/701 |
| 4,765,771 | 8/1988 | Howsley | 29/235 X |
| 4,798,349 | 1/1989 | Manservisi | 242/58.6 X |
| 5,031,293 | 7/1991 | Goedderz | 29/235 |

FOREIGN PATENT DOCUMENTS 2642691 10/1990 France.
746908 3/1956 United Kingdom.
1447904 9/1976 United Kingdom.

Primary Examiner—John M. Jillions
Attorney, Agent, or Firm—Leydig, Voit & Mayer

[57] ABSTRACT

A robot hand receives a length of sealing strip and fits it onto a mounting flange surrounding a vehicle door opening. The hand is carried by the arm of a robot. As the robot moves the hand around the periphery of the door opening, the hand grips the sealing strip and drives it through the hand and around a roller so as to lay it on the flange. An appropriate length of the sealing strip is supplied to the hand by means of a cassette within which the sealing strip is coiled. The hand carries a pick-up plate which grips the cassette by means of locking members. An end of the sealing strip extends out of the cassette on a nose forming part of the inverted lid of the cassette. The cassette is then drawn towards the robot hand, forcing the nose into the entrance of the hand and thus placing the end of the sealing strip between a first pair of drive rollers which are thereafter rotated so as to drive the sealing strip out of the cassette and through the hand.

10 Claims, 9 Drawing Sheets

STRIP HANDLING APPARATUS AND METHOD

This is a divisional of copending application Ser. No. 07/472,356, filed on Jan. 30, 1990, now abandoned.

BACKGROUND OF THE INVENTION

The invention relates to strip handling apparatus. More specifically, though not exclusively, the invention relates to apparatus for handling longitudinal strips in the form of sealing, trimming, finishing and glass-guiding strips such as used in motor vehicle body construction. Some of the exemplary forms of the apparatus to be described, are, in particular, of use for handling such strips before and during their fitment by robot onto a motor vehicle body during its construction.

Embodiments of the invention to be described may be used in conjunction with the apparatus disclosed in our co-pending United Kingdom patent application No. 89 28471 whose content is incorporated herein. The specification of the latter application discloses a robot "hand" arrangement which is adapted to be carried by a robot-controlled arm. The hand receives an end of a longitudinal strip, such as a sealing strip for sealing around a door opening on a motor vehicle body. The sealing strip has a channel-shaped part which is designed for embracingly gripping the flange running around the door opening. As the robot arm positions the hand adjacent to the flange, the hand places the end of the channel-shaped part into embracingly gripping relationship on the flange. Thereafter, the robot arm moves the hand along the flange and around the door opening and, during this process, the hand automatically feeds the strip onto the flange. Embodiments to be described in more detail of the present invention may be used for handling suitable lengths of such strips during storage prior to use, as well as during the process just described by which the robot hand transfers the strip onto the flange.

BRIEF SUMMARY OF THE INVENTION

According to the invention, there is provided a strip holding means adapted to receive a predetermined coiled length of flexible sealing, trimming, finishing or glass-guiding strip for dispensing therefrom by uncoiling.

According to the invention, there is further provided a holding means for receiving a predetermined length of coiled sealing, trimming, finishing or glass-guiding strip, comprising two generally flat relatively stiff and thin members mounted spaced apart and in alignment with each other so as to receive the coiled length of strip sandwich-fashion between them, the lengths of the members being slightly greater than the approximate diametrical size of the coiled strip but their widths being substantially less than this diametrical size, one end of one member being connected to the adjacent end of the other by an upstanding coiled strip retaining wall and the other end of one of the members being held spaced from the other member to define a mouth extending widthwise with respect to the members through which an end of the length of strip protrudes, the members carrying a boss substantially centrally mounted with respect to the members and with a circularly shaped member rotatable about the boss and around which the strip is coiled in use, and the said other member being extended at its end adjacent the opening to carry a distal end of the strip protruding from the coil.

According to the invention, there is still further provided a holding means for receiving a predetermined length of coiled sealing, trimming, finishing or glass-guiding strip, comprising a cassette with a substantially circular base having a peripheral wall defining a gap constituting a mouth for the cassette, a boss substantially centrally mounted within the cassette and carrying a circularly shaped member rotatable about the boss and around which the strip is coiled in use, and a lid for the cassette, the lid defining an extended nose portion which, when the lid is attached to the cassette and the cassette inverted, extends outwardly of and in alignment with the said mouth and carries a distal end of the strip protruding from the coil.

According to the invention, there is also provided apparatus for dispensing predetermined lengths of strip, comprising a plurality of holding means each containing a respective one of the predetermined lengths of strip, strip dispensing means including drive means for driving the strip longitudinally so as to dispense it, and pick-up means for receiving and gripping each of the holding means successively so as to hold it in such juxtaposition with the strip dispensing means that the drive means receives an end of the strip in the holding means and drives it therefrom.

According to the invention, there is yet further provided apparatus for use in mounting an elongate flexible channel-shaped strip onto a mounting flange or the like, comprising a portable body incorporating drive means arranged to feed the strip longitudinally along a predetermined path which is fixed in relation to the body and one distal end of which is external to the body and such as to present the strip for mounting on the flange as the body is moved along and in predetermined relation with the flange, means carried by the body adjacent the other distal end of the path and comprising pick-up means for releasably picking up a strip holding means containing a predetermined length of sealing strip in coiled form and an end of which protrudes from the holding means, and initiating means carried by the body for moving the pick-up means towards the body so that the protruding end of the strip is moved into the said other distal end of the predetermined path and is there engaged by the drive means.

DESCRIPTION OF THE DRAWINGS

Apparatus and methods embodying the invention for handling sealing strips prior to and during their fitment onto motor vehicle bodies will now be described, by way of example only, with reference to the accompanying diagrammatic drawings in which.

DESCRIPTION OF PREFERRED EMBODIMENTS

Figure 1:
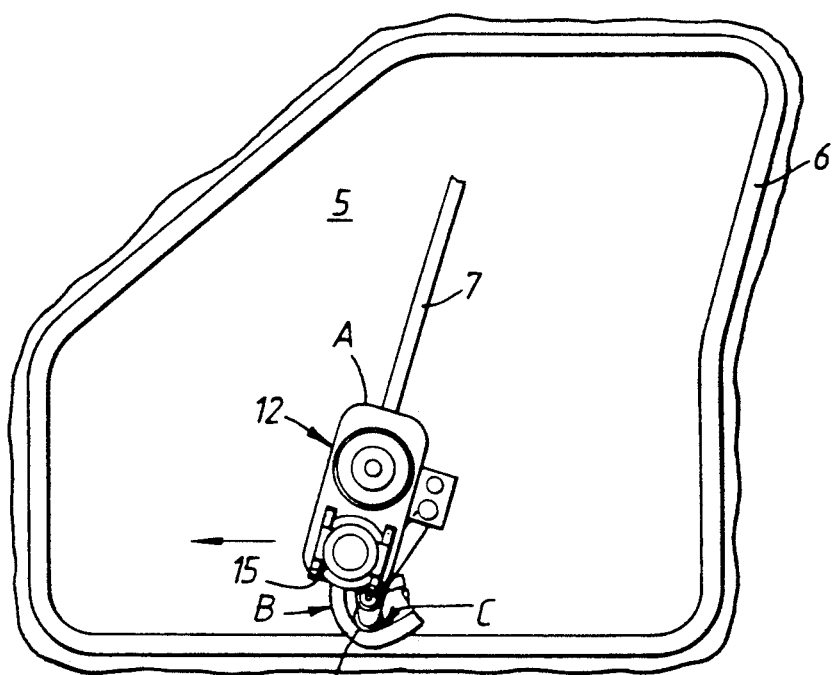
FIG. 1 is a figure corresponding to FIG. 1 of the above-mentioned co-pending patent application and showing the robot hand described in that application.
Figure 2:
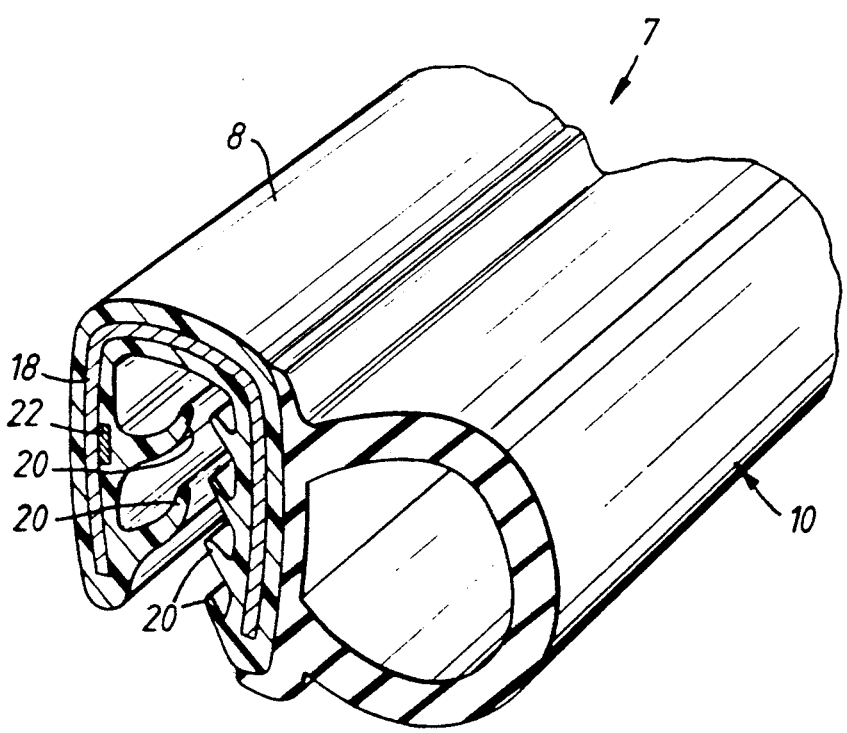
FIG. 2 is a perspective view of an example of one of the sealing strips.
Figure 3:
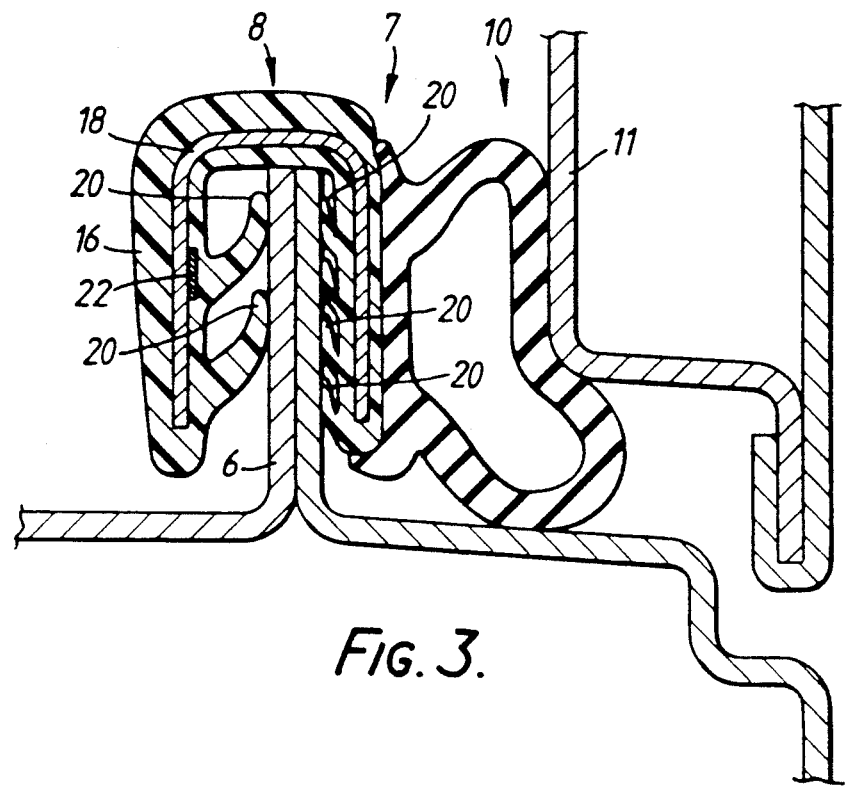
FIG. 3 is a cross-section through the sealing strip of FIG. 2 and showing it mounted on a flange.

FIG. 1 shows a door opening 5 of a motor vehicle body. The door opening is defined by a flange 6 which is formed where the inner and outer skins of the body are welded together. In order to provide a seal for the door opening 5, the manufacture of the car body involves the fitting of a door seal (see FIG. 2) onto the flange 6. As shown in FIG. 2, the door seal comprises a channel-shaped gripping section 8 which, in use, embracingly grips the flange 6, and supports a soft tubular sealing section 10, so that the seal runs around the door opening, with the sealing section on the outside of the opening. As shown in FIG. 3, when the door, part of which is shown diagrammatically at 11, closes onto the opening, it partially compresses the tubular sealing section 10 so as to form a weather-proof seal. The door seal 7 is automatically fitted onto the flange by means of a robot hand 12 as shown in FIG. 1, and a robot arm (not shown), the robot arm supporting the hand 12 by being attached to a fixture 15.

In a manner to be described, a free end of a length of the seal 7 (whose length is sized to fit the periphery of the door opening) is fed into the hand as shown at A in FIG. 1 and the hand automatically grips it and presents the open mouth of the channel of the gripping section 8 towards the flange 6 as shown at B. The strip is driven round a roller 44 (in the manner explained in the co-pending application) and presented with its channel mouth facing the flange. The robot arm is programmed to move the hand 12 (under control of robot drive means not shown) towards the flange so that the gripping section grippingly embraces the flange 6 as shown at C. Thereafter, the robot arm moves the robot hand 12 around the periphery of the door opening and at an appropriate distance from the flange 6. During this movement, the hand automatically and continuously feeds the length of door seal onto the flange 6 until the hand has travelled around the complete periphery of the door opening. At the completion of this travel, the distal end of the door seal will be placed in position on the flange immediately adjacent to the initial end.

As shown more clearly in FIG. 3, the gripping section 8 is made of plastics or rubber material 16 which is extruded over a channel-shaped metal carrier 18. The extruded material 16 is extruded to form gripping and sealing lips 20 on the inside facing walls of the channel, and these make gripping and sealing contact with the side surfaces of the flange 6. The metal carrier may take any suitable form. For example, it may comprise a series of U-shaped metal elements arranged adjacent to each other to define a channel and either connected together by flexible connecting links or completely disconnected from each other. Instead, however, it may comprise wire looped to and fro and extending along the length of the channel. However, other forms of carrier can be used instead. The gripping section may incorporate a substantially inextensible tape or thread 22.

Figure 4:
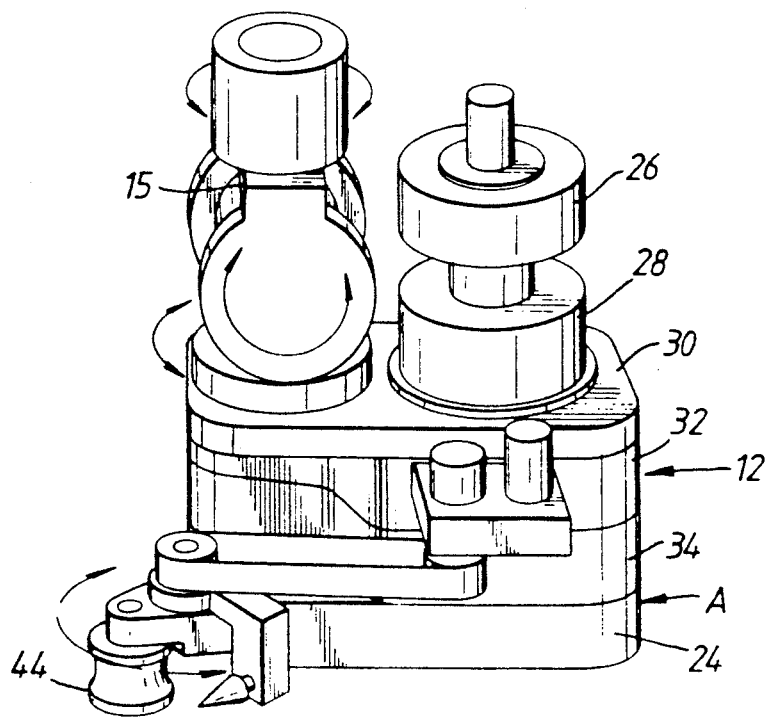
FIG. 4 corresponds to FIG. 4 from the co-pending application and shows the robot hand in more detail.

As shown in FIG. 4, the robot hand 12 comprises a seal drive section 24 containing three pairs of drive rollers (not shown in this Figure) which grip the sides of the seal and are driven so as to feed the seal longitudinally through the hand. These rollers are driven by a main motor 26 via a reduction gearbox 28. The drive shaft from the latter passes through a lid 30 to a belt driving section 32 which distributes the drive from the gearbox output shaft via a drive belt, to the three pairs of rollers in the seal drive section 24. The drive shafts from the belt driving section 32 to the pairs of drive rollers in the seal drive section 24 are supported in bearings in a bearing section 34.

The foregoing assembly process requires a supply of separate sealing strips each of predetermined length, and such supply is achieved by the apparatus now to be described in more detail with reference to other Figures of the drawings.

In this apparatus, each separate sealing strip is supplied to the robot hand 12 in a predetermined length, each length being predetermined in accordance with the peripheral length of the door opening to which it is to be fitted. During the strip manufacturing process, appropriately sized lengths are automatically cut off and each length is then placed in a cassette of the form now to be described with reference to FIGS. 5,6 and 7. In addition, the apparatus incorporates a modified form of the robot hand 12, the modification enabling the hand to receive the cassette and extract the sealing strip from it.

Figure 5:
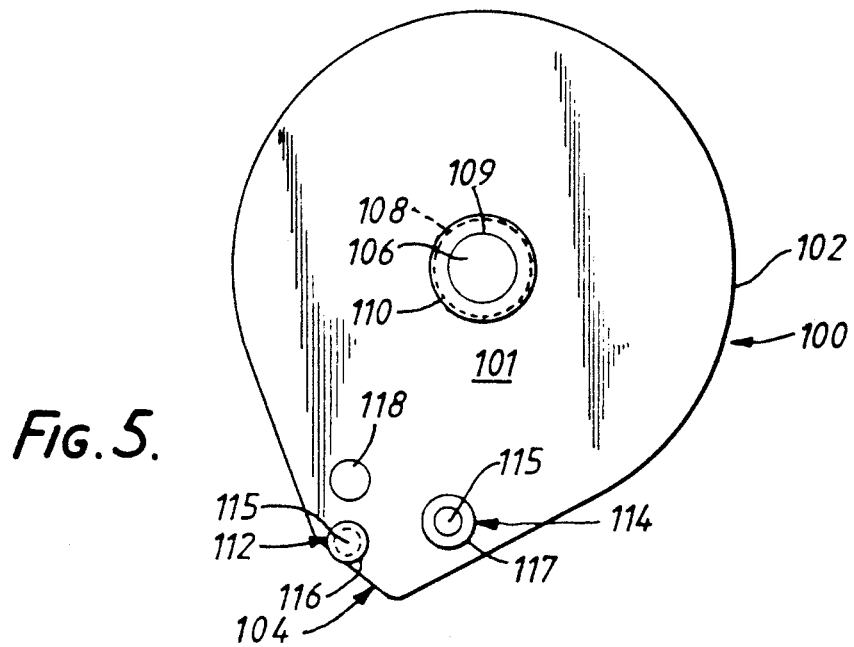
FIG. 5 is a plan view of a cassette used in the apparatus to be described with its lid removed.

As shown in FIG. 5, each cassette 100 is in the form of a generally circular pan having a base 101 and a surrounding relatively low wall 102 upstanding therefrom, the wall being discontinuous so as to leave an open mouth 104. The base has a through hole 106 which is surrounded by a boss 108 having a circularly flanged top 109 and around which a collar 110 is freely rotatable. Also mounted on the base and adjacent the mouth 104 are two rollers 112 and 114, each roller being freely rotatable around a respective pin 115 upstanding from and rigid with the base 101. Roller 112 has a flanged top 116 while roller 114 carries a rotating collar 117 (see FIG. 6). The cassette has a through hole 118 for location purposes.

Figure 6:
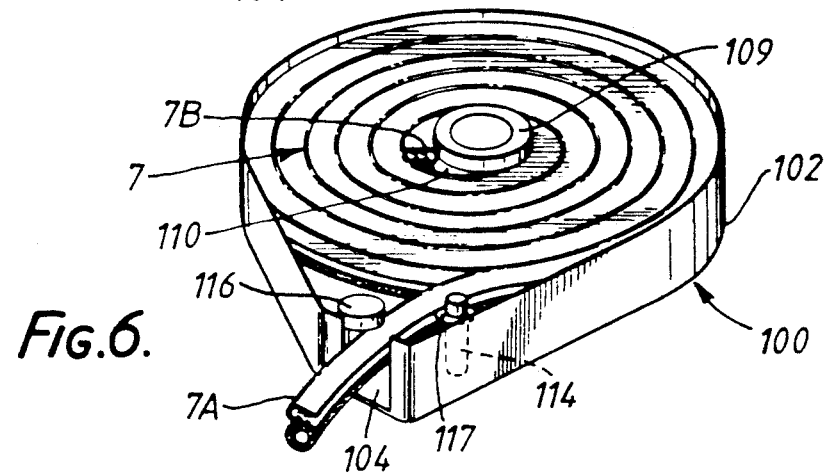
FIG. 6 is a perspective view of the cassette as shown in FIG. 5 but with a length of sealing strip therein.

FIG. 6 shows the cassette in perspective view and with the sealing strip 7 in position in it. As shown, the sealing strip is coiled up within the cassette and with one of its ends 7A passing between and in contact with the rollers 112 and 114 so as to be guided by the rollers, and the flanged top 116 and the collar 117, into and to extend partially from the mouth 104.

The cassette is completed by a lid 120 (FIG. 7) which is shaped to match, generally, the shape of the base and which is secured in position to, and closes off the cassette by being a pressfit on the cassette, the wall 121 of the lid overlapping the wall 102 of the cassette. The lid 120 has a location hole 122 matching the hole 118 (FIG. 5) and a nose 124 which, when the lid is fastened in position, is located in line with the mouth 104 and extends outwardly therefrom, for a purpose to be described.

The cassettes may be made of any suitable material. In certain circumstances, for example, they may be made of stiff cardboard. Preferably, however, they are made of suitable plastics material. If made of plastics material, they will normally be re-usable.

The lengths of sealing strip 7 are assembled into the respective cassette such as by winding each predetermined length of the sealing strip around a cone-shaped former so as to coil up the length of sealing strip which is then placed into the cassette and around the rotatable ring 110 (FIG. 5). The lid 120 is thereafter fixed in position.

It will be noted that a loaded cassette has the end 7A of the sealing strip protruding through the mouth 104 and extending substantially to the distal edge of the nose 124, for a purpose to be described.

Filled cassettes are then assembled together side-by-side in a stack and transported to the vehicle manufacturer. There, the stack of cassettes is positioned adjacent to the robot on the assembly line. In a manner to be described in more detail below, the robot causes the robot hand 12 to pick up a filled cassette from the stack, extract the sealing strip progressively from the cassette and apply it to the flange (in the manner already described) as the robot carries the hand around the door opening.

Figure 8:
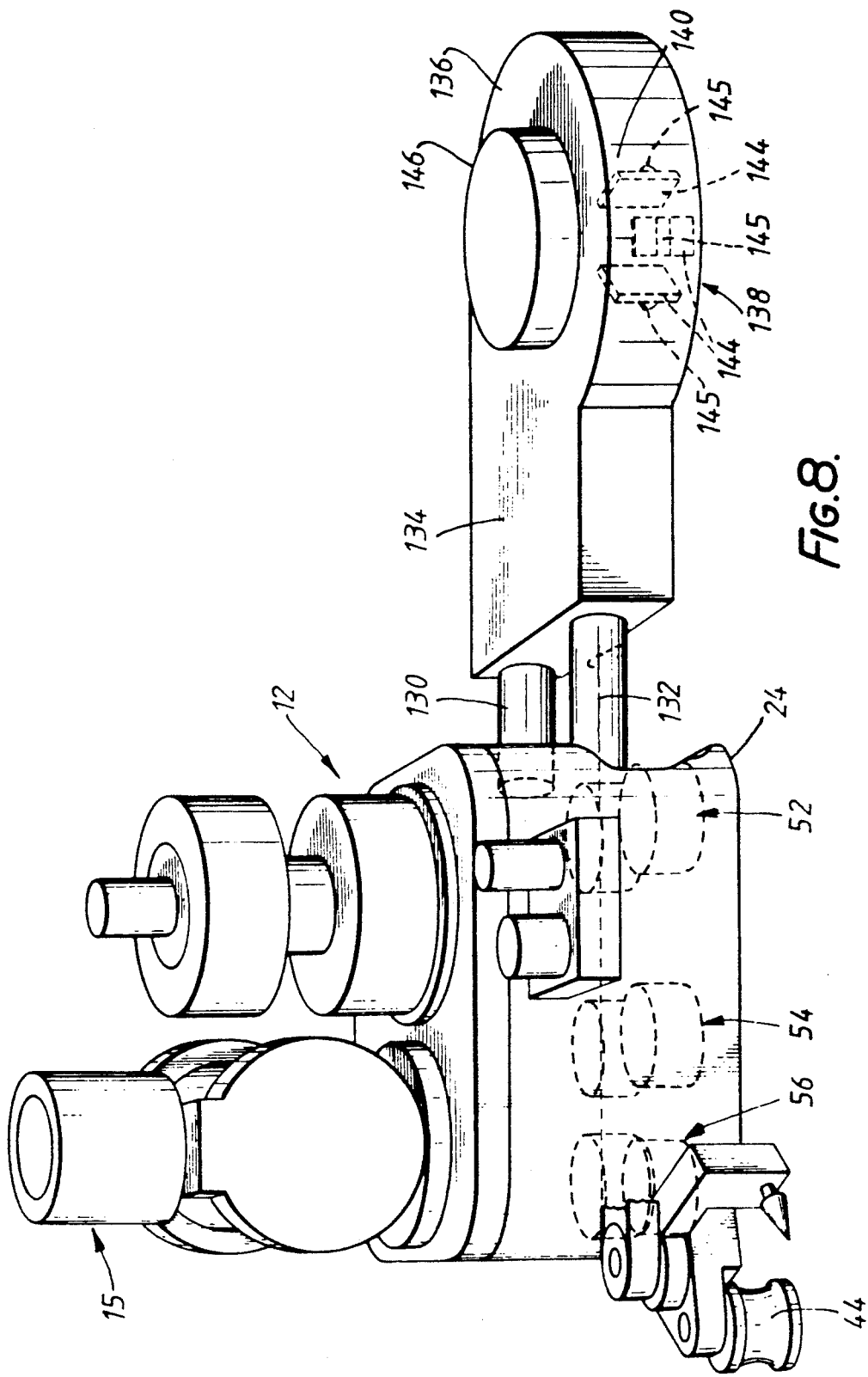
FIG. 8 is a perspective view of the robot hand shown in FIG. 4 but modified by the addition of a pick-up plate for holding the cassette of FIGS. 5 to 7.

FIG. 8 shows a perspective view of the robot hand 12 modified so as to be able to receive and hold a filled cassette. In FIG. 8, some of the external mechanism of the hand is omitted for clarity, the pairs of drive rollers 52,54 and 56 in the drive section 24 are shown dotted, and part of the wall of the drive section 24 is broken away near the seal entrance A.

Figure 9:
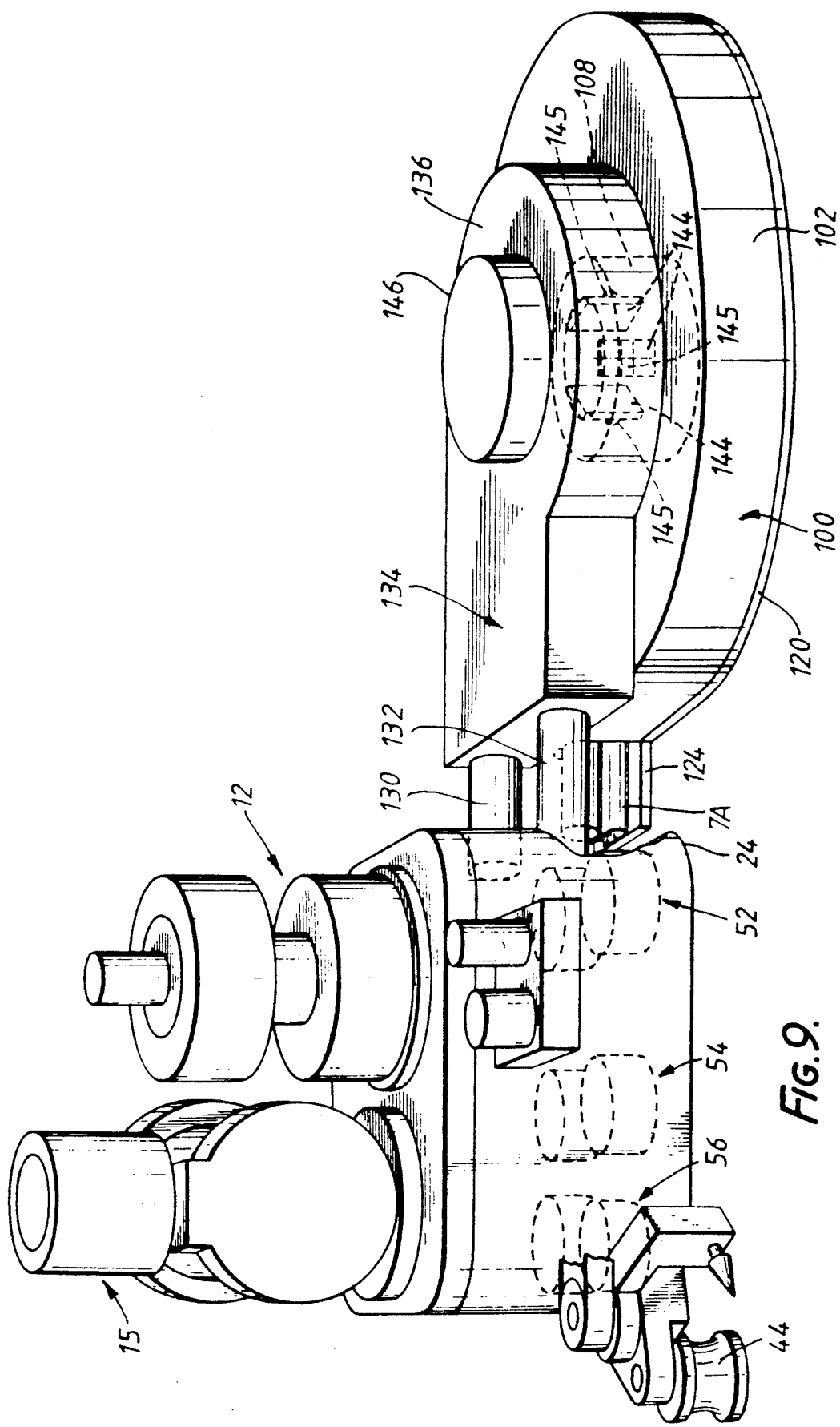
FIG. 9 is a view corresponding to FIG. 8 but showing a loaded cassette gripped by the pick-up plate and held in a first position relative to the robot hand.

As shown in FIG. 8, the body of the robot hand is modified, adjacent its strip entrance A, so as to have two parallel supports 130 and 132 which carry a pick-up plate assembly 134 extending rigidly away from the body of the robot hand. The pick-up plate has a generally circular end part 136 from the underside of which extends an assembly 138 carrying three angularly movable and downwardly extending locking members 144. The locking members 144 are movable by means of a pneumatic unit 146 between a free position and a locking position. When the locking members are in the free position, they form a diameter less than the diameter of the inside of the boss 108 of the cassettes (see FIGS. 5 and 6). With the locking members in this position, therefore, they can freely extend through the bore 106 of an inverted cassette. The locking members are then diametrically expanded by means of the pneumatic unit 146 into their locking positions so that an annular ridge 145 carried on each of the vertical edges moves into engagement with the inside wall of the boss 108 and firmly lock the cassette into position on the pick-up plate, all as shown in FIG. 9. With the cassette 100 in this position on the pick-up plate, it will be observed from FIG. 9 that the nose 124 of the inverted lid 120 lies immediately adjacent the strip entrance A (see FIG. 1) of the robot hand 12 and with the distal end 7A of the strip lying on the nose.

The manner in which the pick-up plate 134 takes up a loaded cassette 100 from a stack thereof will be described in more detail below. Briefly, however, the robot moves the hand (with the pick-up 134 thereon) to a position adjacent the stack so that the locking members 144 (in their free positions) can pass through the opening 106 into the boss 108 of a filled cassette. Thereafter, the locking members 144 move into their locking position so as to lock the cassette to the pick-up plate. The robot then moves the robot hand back into position relative to the door opening ready for placing the strip onto the flange.

Figure 10:
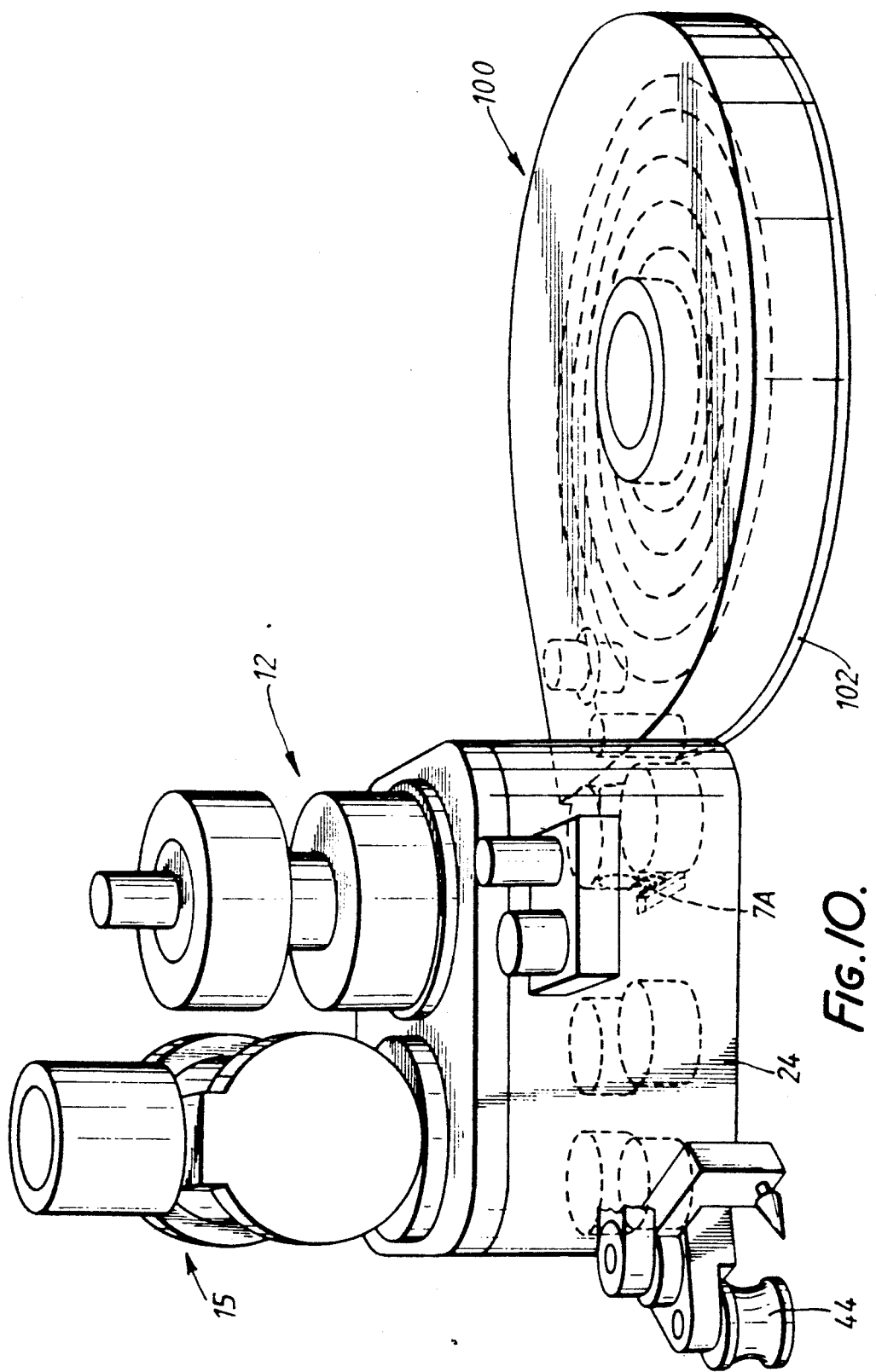
FIG. 10 corresponds to FIG. 9 but shows the cassette in the working position relative to the robot hand and with the pick-up plate omitted for clarity.

During or immediately after this process, the pick-up plate 134 retracts inwardly along the supports 130 and 132 (such as by means of pneumatic piston-cylinder assemblies not shown) towards the body of the robot hand so as to pull the cassette into a position such that the portions of its wall 102 immediately adjacent the mouth 104 abut the strip entrance A on the hand 12. The final position achieved is illustrated diagrammatically in FIG. 10 in which the pick-up plate itself has been omitted for clarity. As will be seen, the result is that the nose 124 enters the strip entrance carrying the leading end 7A of the strip and forcing the latter into the bight of the leading pair of drive rollers 52 in the hand.

The robot hand is now ready for assembling the strip onto the flange. The motor 26 of the robot hand is energised so as to rotate the drive rollers, including rollers 52, and the strip is thus drawn out of the cassette and then emerges through the strip exit of the robot hand in the manner already explained with reference to FIG. 1. The robot moves the robot hand around the flange with the process of automatic fitment of the strip onto the flange proceeding in the manner described above and in the above-mentioned co-pending patent application.

During this process, the strip end 7A is drawn out of the cassette 100, the coil unwinding and rotating the ring 110 (FIG. 6) around the boss 108. This unwinding process is aided by the freely rotatable ring 110 and the rollers 114 and 116. In order to aid it further, the inside surfaces of the cassette may be coated with low friction material.

When the process of assembling the strip onto the flange has been completed, so that the end 7B of the strip has passed out of the cassette and completely through the hand itself, the empty cassette is ready for disconnection and replacement by another filled cassette so as to enable the robot hand to apply a fresh length of sealing strip to another door opening. The pick-up plate 134 is returned along the supports 130 and 132 to the position shown in FIG. 9, thus moving the cassette away from the robot hand and into the position shown in that Figure. The robot then moves the robot hand back towards the stack of cassettes. In a manner to be described in more detail, the locking members 144 on the pick-up plate 134 are moved into the free position so as to release the empty cassette and the robot then moves the pick-up plate into the loading position where it picks up another loaded cassette in the manner already described. The empty cassettes are assembled together and returned to the strip manufacturer for re-filling.

The process by which the robot hand discharges empty cassettes and picks up filled cassettes will now be described in more detail with reference to FIGS. 11.

Figure 11:
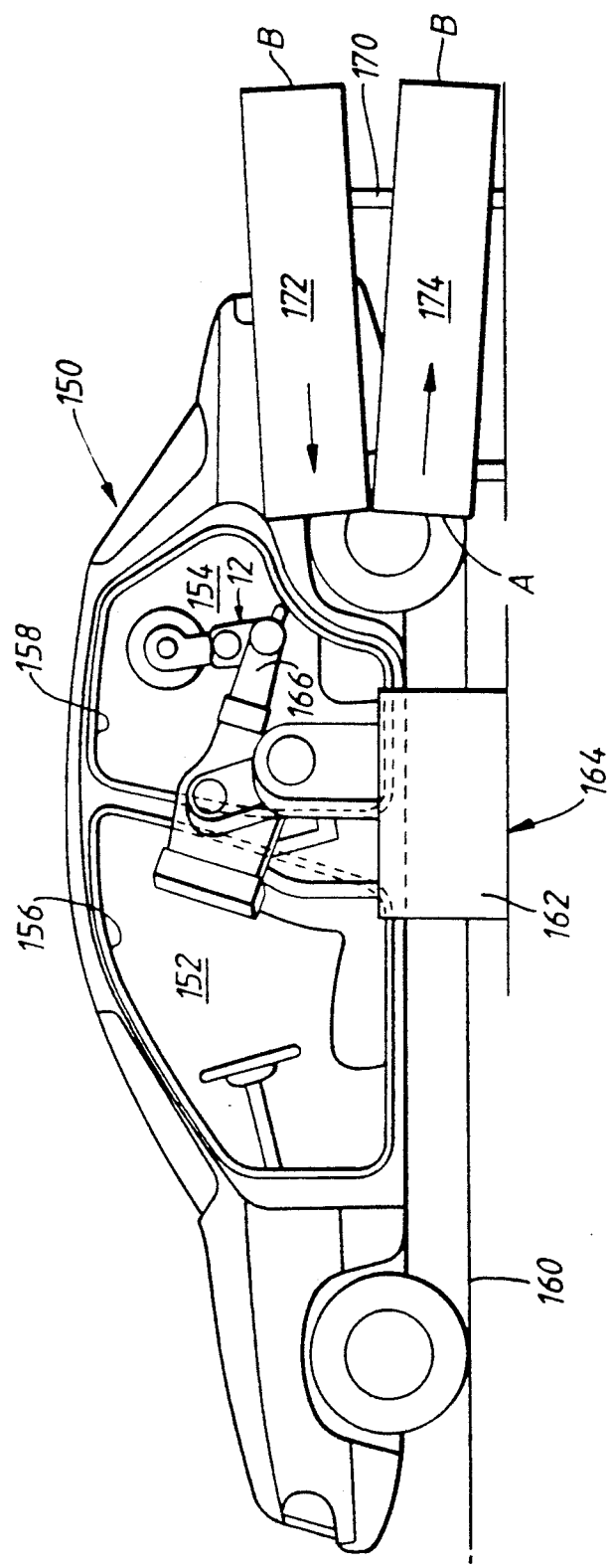
FIG. 11 is a side view of a motor vehicle body during manufacture and illustrating the robot for supporting the robot hand and also showing a stack of cassettes.

FIG. 11 shows a partially completed motor vehicle body 150 with front and rear door openings 152 and 154 surrounded by flanges 156 and 158 to which sealing strips are to be attached. It is assumed that the motor vehicle body 150 is supported on an assembly track 160. The robot 162 is rigidly mounted on a support 164 adjacent to the track 160 and has a robot arm 166 at the end of which is carried the robot hand 12.

A platform arrangement 170 is also mounted adjacent to the track 160 and supports a container 172 containing filled cassettes and a container 174 for receiving empty cassettes. Each container 172, 174 may comprise a suitable elongate box made of cardboard or similar material and designed to receive and locate a number of the cassettes in stacked relationship. It will be noted that the platform 170 is designed so as to support the container 172 so that it is inclined downwardly towards the end A and to support the container 174 so that it extends downwardly away from the end A. At its end A, the container 172 is open but is provided with a peripheral lip to retain the cassettes in place. Similarly, the container 174 is provided with a corresponding lip, for the same purpose, at end B.

During the loading process, the robot 162 moves the robot hand 50 towards the container 172, angularly moving the robot hand on the robot arm so that the pick-up plate 134 is positioned with its locking members 144 directed inwardly of the end A of the container, the locking members being in their free positions. The locking members enter through the opening 106 in the underside of that one of the cassettes 100 which is immediately adjacent to the end A and move into the locking position so as to become locked to the cassette. The robot then moves the robot arm 166 away from the container, thus pulling the locked cassette out of the container 172 and over the peripheral lip. The robot hand is now moved towards the flange 158 around the door opening and fitment of the strip commences in the manner already explained.

When fitment of the strip to the flange has been completed, the robot swings the robot arm 166, with the robot hand 12 thereon carrying the now-empty cassette, towards the end A of the container 174. The robot hand is angularly moved so as to present the cassette with its lid 120 facing towards the open end of the container. The cassette is then placed inside the container and the locking members 144 move into the free position so as to release the cassette. The robot no retracts the robot hand—and moves it towards the end A of the container 172 if a fresh, full, cassette is to be loaded.

The locating holes 118 and 122 may be used to locate the cassettes in the container 172 and on the pick-up plate 134.

It will be understood that the robot may be programmed so as to assemble strips onto the flanges around both the front and rear door openings 152,154 of the vehicle. The strips for the front and rear openings are likely to be of different lengths, and possibly different shapes as well, and cassettes carrying the different strips would be appropriately packed in the container 172.

It will be appreciated that the arrangement of the containers 172 and 174 in relation to the robot, as shown in FIG. 11, may be varied.

The cassettes have the advantage that the strips are protected against damage or distortion during transit to the vehicle manufacturer.

Figure 7:
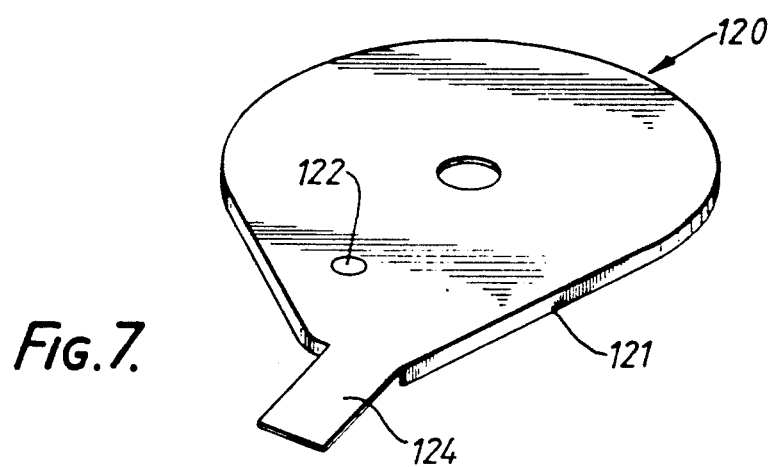
FIG. 7 is a perspective view of a lid of the cassette of FIG. 5.
Figure 12:
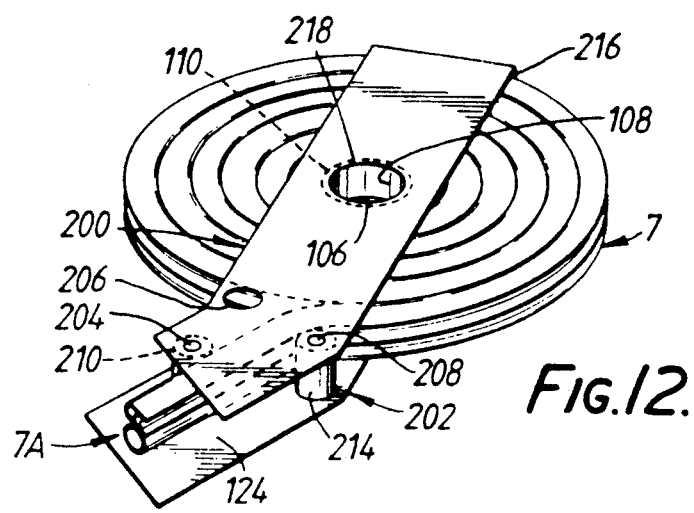
FIGS. 12 and 13 illustrate a modified form of strip holding means which may be used instead of the cassette of in FIGS. 5, 6 and 7.
Figure 13:
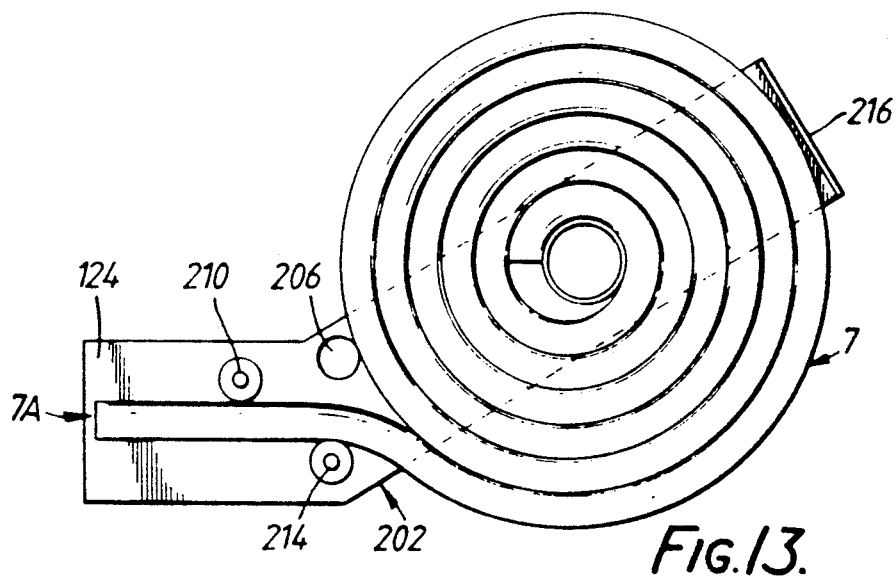

FIGS. 12 and 13 show a modified form of strip holding means which may be used instead of the cassette of FIGS. 5, 6 and 7.

As shown in FIG. 12, this modified strip holding means comprises flat upper and lower members 200 and 202 such as made of stiff plastics or metal for example. The upper member 200 is joined to the lower member 202 by means of pins 204 and 208. These are rigidly fixed to the plate 202 and upstand therefrom and carry freely rotatable rollers 210 and 214. The uppermost ends of the rods 204 and 208 extend through holes in the upper member 200 and are secured thereto by means of nuts or quick-release fasteners. In addition, the upper member 200 is secured to the lower member 202 by being clipped or hinged to a rear wall 216 upstanding from the lower member. The upper member 200 has a through hole 218 and the lower member has a hollow boss 108 surrounding a hole 106 and carrying a freely rotatable collar 110. Items 108 and 110 correspond to the similarly referenced items in FIGS. 5 and 6.

The lower member 202 carries an extending neck 124 corresponding to the neck 124 of FIG. 7.

FIG. 13 shows the upper member 200 removed.

In use, a predetermined length of sealing strip, such as shown at 7, is wound around the boss 108, the coiled length being held in position by the rollers 212 and 214 and the wall 216, and its distal end 7A is led out between rollers 210 and 214 so as to rest on the neck 124. The upper member 200 is then fixed in position. In this way, therefore, the predetermined coiled length of sealing strip is held firmly in position.

The holding means, with the predetermined coiled length of sealing strip in position, is then used in the same manner as for the cassette 100, all as described above.

The holding means of FIGS. 12 and 13 may incorporate a hole 206 extending through the upper and lower members for use in locating a stack of the holding means in predetermined relationship to each other.

It will also be appreciated that the various forms of apparatus described may be used for handling flexible lengths of strips other than the sealing strips described.

The cassette and strip holding means described above are designed to be used in conjunction with a robot arrangement. However, as will now be described, they may be modified to dispense with the need to employ a robot arrangement.

Figure 14:
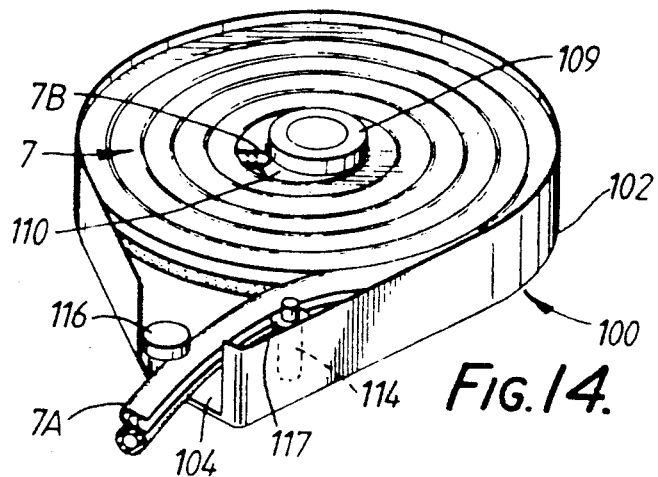
FIGS. 14 and 15 illustrate another modified form of the cassette of FIGS. 5, 6 and 7 and which may be used without the robot of FIG. 1.
Figure 15:
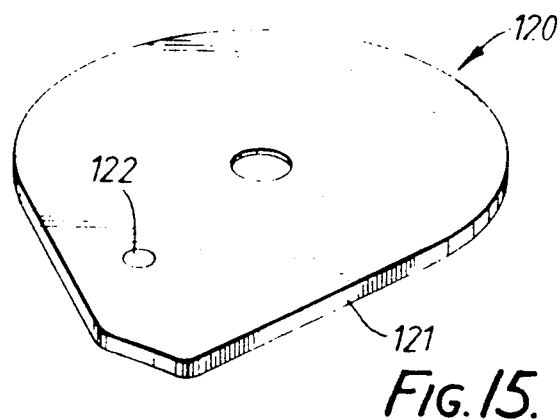

FIGS. 14 and 15 correspond, in general though not exactly, with FIGS. 6 and 7 and illustrate the modified form of the cassette.

The cassette shown in FIGS. 14 and 15 differs from that shown in FIGS. 5,6 and 7 in that the nose 124 of the cassette illustrated in FIGS. 5,6 and 7 is omitted and the shape of the open mouth 104 (FIG. 15) is slightly modified.

The cassette shown in FIGS. 14 and 15 is designed to be used for the purposes of enabling an operator to dispense a length of sealing strip 7 directly on to the flange manually—that is, instead of using the robot described above. Thus, the operator carries the cassette into a position adjacent to the flange surrounding the vehicle door opening so that the end 7A is adjacent the flange and with its channel-shaped profile facing the flange. The operator then transports the cassette around the flange, at the same time pressing the strip, as it uncoilingly dispenses itself from the cassette, so that the channel-shaped portion is placed on and embracingly grips the flange, the force for this purpose being applied by the roller 116.

The operator may at least partially be relieved of the weight of the cassette by attaching it to an overhead counter-balanced cable or the like.

Figure 16:
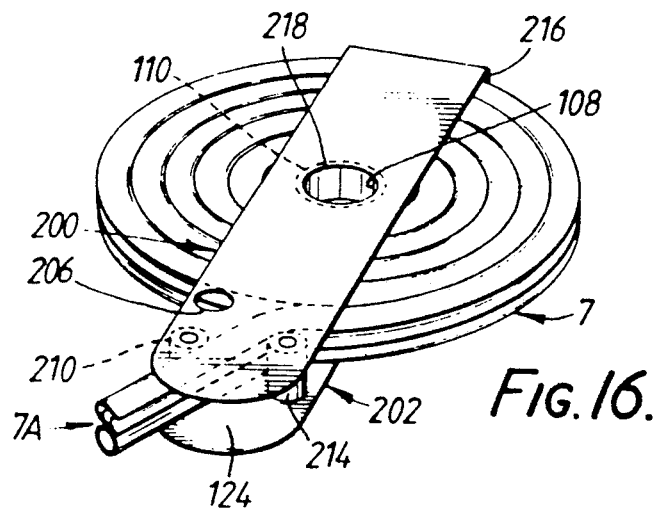
FIG. 16 illustrates a modified form of the strip holding means of FIGS. 12 and 13 and which may be used without the robot of FIG. 1.

FIG. 16 shows a modified form of the holding means of FIGS. 12 and 13 in which the nose 124 is modified in shape so as to reduce the amount of its extension outwardly. In this modified form, the holding means may, like the cassette of FIGS. 14 and 15, be used manually for directly applying the length of sealing strip to the flange.

Thus, the operator holds the holding means, with the coiled length of sealing strip therein, adjacent to the flange around the vehicle door opening so that the end 7A is immediately adjacent the flange and with the open mouth of the channel facing the flange. The operator moves the holding means towards the flange so that the open mouth of the channel at the end 7A embraces the flange. He then manually transports the holding means around the length of the flange so that the length of sealing strip is dispensed onto the flange and from the holding means by uncoiling. At the same time, the operator maintains manual pressure towards the flange so that the roller 214 presses the sealing strip firmly onto the flange.

Again, the operator can at least partially be relieved of the weight of the strip holding means and the strip coiled therein by an overhead counter-balanced cable or the like.

What is claimed is:

1. Apparatus for dispensing predetermined lengths of strip, comprising
    a plurality of holding means each containing a respective one of the predetermined lengths of strip,
    strip dispensing means including drive means for driving the strip longitudinally so as to dispense it,
    pick-up means for receiving and gripping each of the holding means successively so as to hold it in such juxtaposition with the strip dispensing means that the drive means receives an end of the strip in the holding means and drives it therefrom, and
    a robot for carrying the strip dispensing means and moving it along a predetermined path as the strip is dispensed thereby, so as to lay the strip along the said path.

2. Apparatus according to claim 1, in which each holding means holds the predetermined length of strip in coiled-up form.

3. Apparatus according to claim 1, in which an end of the coiled-up length of strip in each holding means protrudes for a predetermined distance therefrom so as to received by the strip dispensing means.

4. Apparatus according to claim 1, in which the drive means comprises at least one pair of drive rollers mounted adjacent to each other for receiving the protruding end of the strip in their bight.

5. Apparatus according to claim 1, in which the pick-up means is mounted on the strip dispensing means.

6. Apparatus according to claim 1, in which the strip is a channel-shaped sealing or trimming strip for mounting on a motor vehicle body.

7. Apparatus for use in mounting an elongate flexible channel-shaped strip onto a mounting flange or the like, comprising
    a portable body incorporating drive means arranged to feed the strip longitudinally along a predetermined path which is fixed in relation to the body and one distal end of which is external to the body and such as to present the strip for mounting on the flange as the body is moved along and in predetermined relation with the flange,
    strip holding means containing a predetermined length of sealing strip in coiled form and an end of which protrudes from the holding means,
    means carried by the body adjacent the other distal end of the path and comprising pick-up means for releasably picking up the strip holding means, and
    initiating means carried by the body for moving the pick-up means towards the body so that the protruding end of the strip is moved into the said other distal end of the predetermined path and is there engaged by the drive means.

8. Apparatus according to claim 7, in which the drive means includes a pair of rotatable rollers and in which the said protruding end of the sealing strip is engaged by the driving means by being moved into their bight.

9. Apparatus according to claim 7, in which the pick-up means comprises a pick-up member supported on telescopic means and carrying one or more locking members for extending into an aperture in the holding means, the locking members being movable between a free position in which they can be freely inserted in the aperture and a locking position in which, when in the said aperture, they lock the holding means to the pick-up member, the telescopic means constituting the initiating means for moving the pick-up member towards the body.

10. Apparatus according to claim 7, in which the said body is carried by an arm supported by and controllably moved by a robot.

* * * * *